US008927443B2

(12) United States Patent
Chakravarty et al.

(10) Patent No.: US 8,927,443 B2
(45) Date of Patent: Jan. 6, 2015

(54) BIODEGRADABLE NONWOVEN LAMINATE

(75) Inventors: Jayant Chakravarty, Woodbury, MN (US); Vasily Topolkaraev, Appleton, WI (US); Ross T. Kaufman, Neenah, WI (US); Stephen Avedis Baratian, Roswell, GA (US); Jared L. Martin, Cumming, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 1417 days.

(21) Appl. No.: 12/094,273

(22) PCT Filed: Apr. 7, 2006

(86) PCT No.: PCT/US2006/013088
§ 371 (c)(1),
(2), (4) Date: May 20, 2008

(87) PCT Pub. No.: WO2007/117235
PCT Pub. Date: Oct. 18, 2007

(65) Prior Publication Data
US 2008/0287026 A1 Nov. 20, 2008

(51) Int. Cl.
*B32B 5/26* (2006.01)
*D04H 1/559* (2012.01)
*D04H 3/011* (2012.01)
*D04H 3/02* (2006.01)
*D04H 3/14* (2012.01)
*D04H 3/147* (2012.01)
*D04H 13/00* (2006.01)
*B32B 5/02* (2006.01)
*B32B 5/08* (2006.01)

(52) U.S. Cl.
CPC *D04H 1/559* (2013.01); *B32B 5/26* (2013.01); *D04H 3/011* (2013.01); *D04H 3/02* (2013.01); *D04H 3/14* (2013.01); *D04H 3/147* (2013.01); *D04H 13/00* (2013.01); *B32B 5/022* (2013.01); *B32B 5/08* (2013.01); *B32B 2250/20* (2013.01); *B32B 2262/0276* (2013.01); *B32B 2262/12* (2013.01); *B32B 2307/7163* (2013.01); *B32B 2535/00* (2013.01); *Y10S 428/913* (2013.01)
USPC .......... 442/382; 442/389; 442/400; 442/401; 442/414; 428/913

(58) Field of Classification Search
USPC .......... 442/382, 389, 400, 401, 414; 428/913
See application file for complete search history.

(56) References Cited

U.S. PATENT DOCUMENTS 5,039,783 A 8/1991 Brunelle et al.
5,053,482 A 10/1991 Tietz
(Continued)

FOREIGN PATENT DOCUMENTS

EP 0731198 A2 9/1996
EP 0731198 A3 9/1996
(Continued)

OTHER PUBLICATIONS

Abstract of Korean Patent No. KR1020010057068A, Jul. 4, 2001.
(Continued)

*Primary Examiner* — Elizabeth Cole
(74) *Attorney, Agent, or Firm* — Dority & Manning, P.A.

(57) ABSTRACT

A biodegradable nonwoven laminate is provided. The laminate comprises a spunbond layer formed from substantially continuous filaments that contain a first aliphatic polyester having a melting point of from about 50° C. to about 160° C. The meltblown layer is formed from microfibers that contain a second aliphatic polyester having a melting point of from about 50° C. to about 160° C. The first aliphatic polyester, the second aliphatic polyester, or both have an apparent viscosity of from about 20 to about 215 Pascal-seconds, as determined at a temperature of 160° C. and a shear rate of 1000 sec-1. The first aliphatic polyester may be the same or different than the second aliphatic polyester.

20 Claims, 1 Drawing Sheet

(56) References Cited

U.S. PATENT DOCUMENTS

| | | |
|---|---|---|
| 5,108,820 A | 4/1992 | Kaneko et al. |
| 5,108,827 A | 4/1992 | Gessner |
| 5,188,885 A | 2/1993 | Timmons et al. |
| 5,231,161 A | 7/1993 | Brunelle et al. |
| 5,262,460 A | 11/1993 | Suzuki et al. |
| 5,270,401 A | 12/1993 | Sham et al. |
| 5,292,783 A | 3/1994 | Buchanan et al. |
| 5,336,552 A | 8/1994 | Strack et al. |
| 5,350,624 A | 9/1994 | Georger et al. |
| 5,374,259 A * | 12/1994 | Takahashi et al. ............ 604/367 |
| 5,382,400 A | 1/1995 | Pike et al. |
| 5,407,984 A | 4/1995 | Brunelle et al. |
| 5,432,000 A | 7/1995 | Young, Sr. et al. |
| 5,446,079 A | 8/1995 | Buchanan et al. |
| 5,464,688 A | 11/1995 | Timmons et al. |
| 5,466,517 A | 11/1995 | Eschwey et al. |
| 5,527,976 A | 6/1996 | Takekoshi et al. |
| 5,554,657 A | 9/1996 | Brownscombe et al. |
| 5,559,171 A | 9/1996 | Buchanan et al. |
| 5,580,911 A | 12/1996 | Buchanan et al. |
| 5,593,778 A | 1/1997 | Kondo et al. |
| 5,599,858 A | 2/1997 | Buchanan et al. |
| 5,614,298 A | 3/1997 | Tanaka et al. |
| 5,668,186 A | 9/1997 | Brunelle et al. |
| 5,688,582 A | 11/1997 | Nagaoka et al. |
| 5,753,736 A | 5/1998 | Bhat et al. |
| 5,783,505 A | 7/1998 | Duckett et al. |
| 5,817,199 A | 10/1998 | Brennecke et al. |
| 5,817,721 A | 10/1998 | Warzelhan et al. |
| 5,851,937 A | 12/1998 | Wu et al. |
| 5,895,710 A | 4/1999 | Sasse et al. |
| 5,900,322 A | 5/1999 | Buchanan et al. |
| 5,910,545 A | 6/1999 | Tsai et al. |
| 5,945,480 A | 8/1999 | Wang et al. |
| 5,952,433 A | 9/1999 | Wang et al. |
| 6,045,908 A | 4/2000 | Nakajima et al. |
| 6,063,895 A | 5/2000 | Chung et al. |
| 6,075,118 A | 6/2000 | Wang et al. |
| 6,090,494 A | 7/2000 | Rao |
| 6,177,193 B1 | 1/2001 | Tsai et al. |
| 6,194,483 B1 | 2/2001 | Tsai et al. |
| 6,197,860 B1 | 3/2001 | Tsai et al. |
| 6,201,068 B1 | 3/2001 | Tsai et al. |
| 6,218,321 B1 | 4/2001 | Lorcks et al. |
| 6,225,388 B1 | 5/2001 | Tsai et al. |
| 6,235,393 B1 | 5/2001 | Kimura et al. |
| 6,245,831 B1 | 6/2001 | Tsai et al. |
| 6,258,924 B1 | 7/2001 | Warzelhan et al. |
| 6,268,434 B1 | 7/2001 | Tsai et al. |
| 6,399,716 B2 | 6/2002 | Chung et al. |
| 6,420,027 B2 | 7/2002 | Kimura et al. |
| 6,420,048 B1 | 7/2002 | Wang |
| 6,495,656 B1 | 12/2002 | Haile et al. |
| 6,500,897 B2 | 12/2002 | Wang et al. |
| 6,506,873 B1 | 1/2003 | Ryan et al. |
| 6,525,164 B2 | 2/2003 | Faler |
| 6,544,455 B1 | 4/2003 | Tsai |
| 6,552,124 B2 | 4/2003 | Wang et al. |
| 6,552,162 B1 | 4/2003 | Wang et al. |
| 6,562,938 B2 | 5/2003 | Haile et al. |
| 6,576,576 B1 | 6/2003 | Wang et al. |
| 6,579,934 B1 | 6/2003 | Wang et al. |
| 6,607,996 B1 | 8/2003 | Matsunaga et al. |
| 6,623,853 B2 | 9/2003 | Branum et al. |
| 6,623,854 B2 | 9/2003 | Bond |
| 6,635,799 B1 | 10/2003 | Osborn, III et al. |
| 6,660,211 B2 | 12/2003 | Topolkaraev et al. |
| 6,686,303 B1 | 2/2004 | Haynes et al. |
| 6,709,526 B1 | 3/2004 | Bailey et al. |
| 6,713,595 B2 | 3/2004 | Chung et al. |
| 6,740,401 B1 | 5/2004 | Yahata et al. |
| 6,743,506 B2 | 6/2004 | Bond et al. |
| 6,756,412 B2 | 6/2004 | Muzzy |
| 6,783,854 B2 | 8/2004 | Bond |
| 6,787,493 B1 | 9/2004 | Nagaoka et al. |
| 6,802,895 B2 | 10/2004 | Mackey et al. |
| 6,811,740 B2 | 11/2004 | James et al. |
| 6,838,403 B2 | 1/2005 | Tsai et al. |
| 6,863,971 B2 | 3/2005 | Halahmi et al. |
| 6,872,674 B2 | 3/2005 | Williams et al. |
| 6,890,872 B2 | 5/2005 | Bond et al. |
| 6,890,989 B2 | 5/2005 | Wang et al. |
| 6,905,759 B2 | 6/2005 | Topolkaraev et al. |
| 6,946,195 B2 | 9/2005 | Griffith et al. |
| 6,946,506 B2 | 9/2005 | Bond et al. |
| 6,953,622 B2 | 10/2005 | Tsai et al. |
| 7,001,562 B2 | 2/2006 | Schiffer et al. |
| 7,029,620 B2 | 4/2006 | Gordon et al. |
| 7,037,983 B2 | 5/2006 | Huang et al. |
| 7,053,151 B2 | 5/2006 | Wang et al. |
| 7,060,867 B2 | 6/2006 | Jameson |
| 7,077,994 B2 | 7/2006 | Bond et al. |
| 7,101,623 B2 | 9/2006 | Jordan et al. |
| 7,153,569 B2 | 12/2006 | Kaufman et al. |
| 7,193,032 B2 | 3/2007 | Culbert et al. |
| 7,241,838 B2 | 7/2007 | Shelby et al. |
| 7,368,503 B2 | 5/2008 | Hale |
| 7,468,335 B2 | 12/2008 | Imes et al. |
| 2002/0127939 A1 | 9/2002 | Hwo et al. |
| 2002/0168912 A1 | 11/2002 | Bond et al. |
| 2003/0022569 A1 | 1/2003 | Lee et al. |
| 2003/0022581 A1 | 1/2003 | Tsai et al. |
| 2003/0092343 A1 | 5/2003 | Bond et al. |
| 2003/0134915 A1 | 7/2003 | Scantlebury et al. |
| 2003/0176136 A1 | 9/2003 | Wadsworth |
| 2003/0191442 A1 | 10/2003 | Bewick-Sonntag et al. |
| 2004/0000313 A1 | 1/2004 | Gaynor et al. |
| 2004/0002273 A1 | 1/2004 | Fitting et al. |
| 2004/0053047 A1 | 3/2004 | Jackson et al. |
| 2004/0102123 A1 | 5/2004 | Bowen, Jr. et al. |
| 2004/0126578 A1 * | 7/2004 | Tsai et al. ..................... 428/373 |
| 2004/0132873 A1 | 7/2004 | Bailey et al. |
| 2005/0054999 A1 | 3/2005 | Morman et al. |
| 2005/0112350 A1 | 5/2005 | Ning |
| 2005/0112363 A1 | 5/2005 | Ning |
| 2005/0208294 A1 | 9/2005 | Kaufman et al. |
| 2007/0082573 A1 | 4/2007 | Noda et al. |
| 2007/0219339 A1 | 9/2007 | Fregoso-Infante et al. |

FOREIGN PATENT DOCUMENTS

| | | |
|---|---|---|
| EP | 0905292 A1 | 3/1999 |
| EP | 1397536 B1 | 3/2004 |
| EP | 1397537 B1 | 3/2004 |
| EP | 1397538 B1 | 3/2004 |
| EP | 1397539 B1 | 3/2004 |
| JP | 7109659 | 4/1995 |
| JP | 71251218 | 5/1995 |
| JP | 11043857 | 2/1999 |
| JP | 11050369 | 2/1999 |
| JP | 11117164 | 4/1999 |
| JP | 11286864 | 10/1999 |
| JP | 2001172829 A | 6/2001 |
| JP | 2003064568 | 3/2003 |
| JP | 2003193349 A | 7/2003 |
| JP | 2005048350 A | 2/2005 |
| WO | WO 9850611 A1 | 11/1998 |
| WO | WO 02090629 A1 | 11/2002 |
| WO | WO 02090630 A1 | 11/2002 |
| WO | WO 2004061172 A2 | 7/2004 |
| WO | WO 2004061172 A3 | 7/2004 |
| WO | WO 2007070064 A1 | 6/2007 |
| WO | WO 2008008067 A1 | 1/2008 |
| WO | WO 2008008068 A1 | 1/2008 |
| WO | WO 2008008074 A1 | 1/2008 |
| WO | WO 2008073099 A1 | 6/2008 |

OTHER PUBLICATIONS

Abstract of Korean Patent No. KR1020030022514A, Mar. 17, 2003.
Abstract of Korean Patent No. KR1020040005193A, Jan. 16, 2004.
Abstract of Korean Patent No. KR1020040005194A, Jan. 16, 2004.
ASTM D 1117-97—*Standard Test Methods for Nonwoven Fabrics*, Mar. 10, 1997, pp. 311-313.

(56) References Cited

OTHER PUBLICATIONS

ASTM D 1238-04c—*Standard Test Method for Melt Flow Rates of Thermoplastics by Extrusion Plastometer*, current edition approved Dec. 1, 2004, originally approved in 1965, pp. 1-14.

ASTM D 1239-92—*Standard Test Method for Resistance of Plastic Films to Extraction by Chemicals*, current edition approved Aug. 15, 1992, pp. 281-282.

ASTM D 3418-03 (D 3417-99)—*Standard Test Method for Transition Temperatures and Enthalpies of Fusion and Crystallization of Polymers by Differential Scanning Calorimetry*, current edition approved Dec. 1, 2003, originally approved in 1975, pp. 66-72.

ASTM D 5034-95—*Standard Test Method for Breaking Strength and Elongation of Textile Fabrics (Grab Test)*, current edition approved May 15, 1995, pp. 674-681.

ASTM D 5338-92—*Standard Test Method for Determining Aerobic Biodegradation of Plastic Materials Under Controlled Composting Conditions*, current edition approved Dec. 15, 1992, pp. 456-461.

ASTM D 7191-05—*Standard Test Method for Determination of Moisture in Plastics by Relative Humidity Sensor*, current edition approved Nov. 1, 2005, pp. 1-4.

Article—*Biodegradation of aliphatic-aromatic copolyesters: evaluation of the final biodegradability and ecotoxicological impact of degradation intermediates*, Witt et al., Chemosphere 44, 2001, pp. 289-299.

Article—*Rheological Properties of Poly(lactides). Effect of Molecular Weight and Temperature on the Viscoelasticity of Poly(l-lactic acid)*, Cooper-White et al., Journal of Polymer Science: Part B: Polymer Physics, vol. 37, 1999, pp. 1803-1814.

Article—*Synthesis of Oligoester α,ω-diols by Alcoholysis of PET through the Reactive Extrusion Process*, Dannoux et al., The Canadian Journal of Chemical Engineering, vol. 80, Dec. 2002, pp. 1075-1082.

Product Information on Ecoflex® from BASF—The Chemical Company, Sep. 22, 2005, 4 pages.

Product Information from Ingeo and NatureWorks®—PLA Polymer 6201D, 6202D, and 6302D, 2005, 11 pages.

Search Report and Written Opinion for PCT/US2006/013088, Aug. 22, 2006, 13 pages.

Related U.S. Patent Applications.

\* cited by examiner

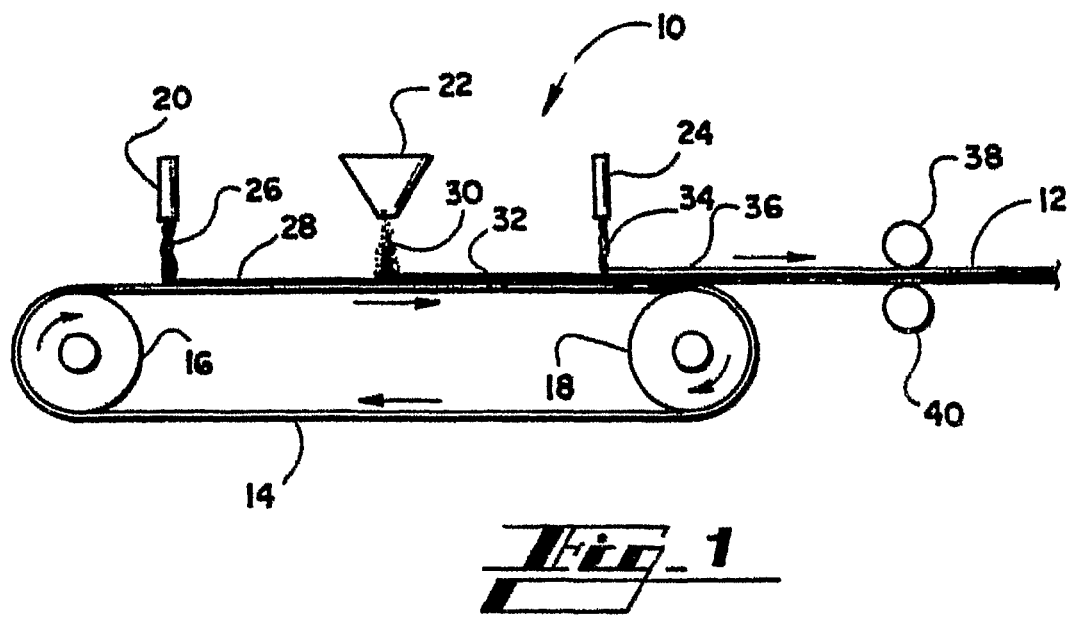
Fig_1
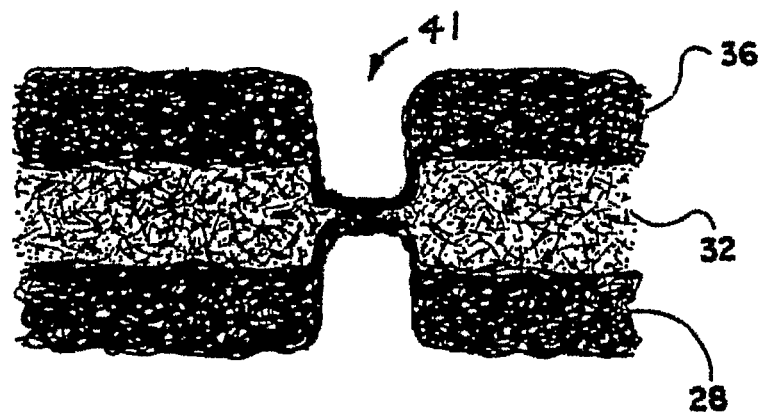
Fig_2

BIODEGRADABLE NONWOVEN LAMINATE

This application is a 371 of PCT/US2006/013088 filed Apr. 7, 2006.

BACKGROUND OF THE INVENTION

Nonwoven fabric laminates are useful for a wide variety of applications, such as in wipers, towels, industrial garments, medical garments, medical drapes, sterile wraps, etc. Spunbond/meltblown/spunbond ("SMS") laminates, for instance, contain an internal meltblown barrier layer positioned between two outer spunbond layers. The meltblown layer is porous, yet inhibits the penetration of fluids and bacteria through the laminate, and the spunbond layers provide enhanced strength and durability to the laminate. Generally, such nonwoven fabric laminates are made from polyolefin fibers, such as polypropylene. Despite the benefits provided by such fabric laminates, however, a need nevertheless remains to enhance their biodegradability.

SUMMARY OF THE INVENTION

In accordance with one embodiment of the present invention, a biodegradable nonwoven laminate is disclosed. The laminate comprises a spunbond layer formed from substantially continuous filaments that contain a first aliphatic polyester having a melting point of from about 50° C. to about 160° C. The meltblown layer is formed from microfibers that contain a second aliphatic polyester having a melting point of from about 50° C. to about 160° C. The first aliphatic polyester, the second aliphatic polyester, or both have an apparent viscosity of from about 20 to about 215 Pascal-seconds, as determined at a temperature of 160° C. and a shear rate of 1000 sec$^{-1}$. The first aliphatic polyester may be the same or different than the second aliphatic polyester.

Other features and aspects of the present invention are discussed in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which:

FIG. 1 is a schematic illustration of a process that may be used in one embodiment of the present invention to form a nonwoven laminate; and FIG. 2 is a partially cut-away, cross-sectional view of a nonwoven laminate that may be formed according to one embodiment of the present invention.

Repeat use of references characters in the present specification and drawings is intended to represent same or analogous features or elements of the invention.

DETAILED DESCRIPTION OF REPRESENTATIVE EMBODIMENTS

Reference now will be made in detail to various embodiments of the invention, one or more examples of which are set forth below. Each example is provided by way of explanation of the invention, not limitation of the invention. In fact, it will be apparent to those skilled in the art that various modifications and variations may be made in the present invention without departing from the scope or spirit of the invention. For instance, features illustrated or described as part of one embodiment, may be used on another embodiment to yield a still further embodiment. Thus, it is intended that the present invention covers such modifications and variations as come within the scope of the appended claims and their equivalents.

DEFINITIONS

As used herein, the term "biodegradable" or "biodegradable polymer" generally refers to a material that degrades from the action of naturally occurring microorganisms, such as bacteria, fungi, and algae; environmental heat; moisture; or other environmental factors. The biodegradability of a material may be determined using ASTM Test Method 5338.92.

As used herein, the term "fibers" refer to elongated extrudates formed by passing a polymer through a forming orifice such as a die. Unless noted otherwise, the term "fibers" includes discontinuous fibers having a definite length and substantially continuous filaments. Substantially filaments may, for instance, have a length much greater than their diameter, such as a length to diameter ratio ("aspect ratio") greater than about 15,000 to 1, and in some cases, greater than about 50,000 to 1.

As used herein, the term "monocomponent" refers to fibers formed one polymer. Of course, this does not exclude fibers to which additives have been added for color, anti-static properties, lubrication, hydrophilicity, liquid repellency, etc.

As used herein, the term "multicomponent" refers to fibers formed from at least two polymers (e.g., bicomponent fibers) that are extruded from separate extruders. The polymers are arranged in substantially constantly positioned distinct zones across the cross-section of the fibers. The components may be arranged in any desired configuration, such as sheath-core, side-by-side, pie, island-in-the-sea, and so forth. Various methods for forming multicomponent fibers are described in U.S. Pat. No. 4,789,592 to Taniguchi et al. and U.S. Pat. No. 5,336,552 to Strack et al., U.S. Pat. No. 5,108,820 to Kaneko, et al., U.S. Pat. No. 4,795,668 to Kruege, et al., U.S. Pat. No. 5,382,400 to Pike, et al., U.S. Pat. No. 5,336,552 to Strack, et al., and U.S. Pat. No. 6,200,669 to Marmon, et al., which are incorporated herein in their entirety by reference thereto for all purposes. Multicomponent fibers having various irregular shapes may also be formed, such as described in U.S. Pat. No. 5,277,976 to Hogle, et al., U.S. Pat. No. 5,162,074 to Hills, U.S. Pat. No. 5,466,410 to Hills, U.S. Pat. No. 5,069,970 to Largman, et al., and U.S. Pat. No. 5,057,368 to Largman, et al., which are incorporated herein in their entirety by reference thereto for all purposes.

As used herein, the term "multiconstituent" refers to fibers formed from at least two polymers (e.g., biconstituent fibers) that are extruded from the same extruder. The polymers are not arranged in substantially constantly positioned distinct zones across the cross-section of the fibers. Various multiconstituent fibers are described in U.S. Pat. No. 5,108,827 to Gessner, which is incorporated herein in its entirety by reference thereto for all purposes.

As used herein, the term "nonwoven web" refers to a web having a structure of individual fibers that are randomly interlaid, not in an identifiable manner as in a knitted fabric. Nonwoven webs include, for example, meltblown webs, spunbond webs, carded webs, wet-laid webs, airlaid webs, coform webs, hydraulically entangled webs, etc. The basis weight of the nonwoven web may generally vary, but is typically from about 5 grams per square meter ("gsm") to 200 gsm, in some embodiments from about 10 gsm to about 150 gsm, and in some embodiments, from about 15 gsm to about 100 gsm.

As used herein, the term "meltblown" web or layer generally refers to a nonwoven web that is formed by a process in which a molten thermoplastic material is extruded through a plurality of fine, usually circular, die capillaries as molten fibers into converging high velocity gas (e.g. air) streams that attenuate the fibers of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Butin, et al.; U.S. Pat. No. 4,307,143 to Meitner, et al.; and U.S. Pat. No. 4,707,398 to Wisneski, et al., which are incorporated herein in their entirety by reference thereto for all purposes. Meltblown fibers may be substantially continuous or discontinuous, and are generally tacky when deposited onto a collecting surface.

As used herein, the term "spunbond" web or layer generally refers to a nonwoven web containing small diameter substantially continuous filaments. The filaments are formed by extruding a molten thermoplastic material from a plurality of fine, usually circular, capillaries of a spinnerette with the diameter of the extruded filaments then being rapidly reduced as by, for example, eductive drawing and/or other well-known spunbonding mechanisms. The production of spunbond webs is described and illustrated, for example, in U.S. Pat. No. 4,340,563 to Appel, et al., U.S. Pat. No. 3,692,618 to Dorschner, et al., U.S. Pat. No. 3,802,817 to Matsuki, et al., U.S. Pat. No. 3,338,992 to Kinney, U.S. Pat. No. 3,341,394 to Kinney, U.S. Pat. No. 3,502,763 to Hartman, U.S. Pat. No. 3,502,538 to Levy, U.S. Pat. No. 3,542,615 to Dobo, et al., and U.S. Pat. No. 5,382,400 to Pike, et al., which are incorporated herein in their entirety by reference thereto for all purposes. Spunbond filaments are generally not tacky when they are deposited onto a collecting surface. Spunbond filaments may sometimes have diameters less than about 40 micrometers, and are often between about 5 to about 20 micrometers.

DETAILED DESCRIPTION

Generally speaking, the present invention is directed to a nonwoven laminate that contains a meltblown layer and spunbond layer. More specifically, the meltblown and spunbond layers contain fibers formed from one or more "low melting point" biodegradable aliphatic polyesters. Typically, such polyesters have a melting point of from about 50° C. to about 160° C., in some embodiments from about 80° C. to about 160° C., and in some embodiments, from about 100° C. to about 140° C. "Low melting point" aliphatic polyesters are useful in that they biodegrade at a fast rate and are generally soft. The glass transition temperature ("$T_g$") of the low melting point polyesters may also be relatively low to improve flexibility and processability of the polymers. For example, the low melting point aliphatic polyesters may have a $T_g$ of about 25° C. or less, in some embodiments about 0° C. or less, and in some embodiments, about −10° C. or less.

Examples of aliphatic polyesters that may have a low melting point and glass transition temperature include aliphatic polyesters with repeating units of at least 5 carbon atoms (e.g., polyhydroxyvalerate, polyhydroxybutyrate-hydroxyvalerate copolymer and polycaprolactone), and succinate-based aliphatic polymers (e.g., polybutylene succinate, polybutylene succinate adipate, and polyethylene succinate). More specific examples may include polyethylene oxalate, polyethylene malonate, polyethylene succinate, polypropylene oxalate, polypropylene malonate, polypropylene succinate, polybutylene oxalate, polybutylene malonate, polybutylene succinate, and blends and copolymers of these compounds. Among these compounds, polybutylene succinate and copolymers thereof are normally preferred.

Aliphatic polyesters are typically synthesized through the condensation polymerization of a polyol and an aliphatic dicarboxylic acid or an anhydride thereof. The polyols may be substituted or unsubstituted, linear or branched, polyols selected from polyols containing 2 to about 8 carbon atoms, polyalkylene ether glycols containing 2 to 8 carbon atoms, and cycloaliphatic diols containing about 4 to about 12 carbon atoms. Substituted polyols typically contain 1 to about 4 substituents independently selected from halo, $C_6$-$C_{10}$ aryl and $C_1$-$C_4$ alkoxy. Examples of polyols that may be used include, but are not limited to, ethylene glycol, diethylene glycol, propylene glycol, 1,3-propanediol, 2,2-dimethyl-1,3-propanediol, 1,3-butanediol, 1,4-butanediol, 1,5-pentanediol, 1,6-hexanediol, polyethylene glycol, diethylene glycol, 2,2,4-trimethyl-1,6-hexanediol, thiodiethanol, 1,3-cyclohexanedimethanol, 1,4-cyclohexanedimethanol, 2,2,4,4-tetramethyl-1,3-cyclobutanediol, triethylene glycol, and tetraethylene glycol. Preferred polyols include 1,4-butanediol; 1,3-propanediol; ethylene glycol; 1,6-hexanediol; diethylene glycol; and 1,4-cyclohexanedimethanol. Representative aliphatic dicarboxylic acids that may be used include substituted or unsubstituted, linear or branched, non-aromatic dicarboxylic acids selected from aliphatic dicarboxylic acids containing 2 to about 12 carbon atoms and cycloaliphatic dicarboxylic acids containing about 5 to about 10 carbon atoms. The substituted non-aromatic dicarboxylic acids will typically contain 1 to about 4 substituents selected from halo, $C_6$-$C_{10}$ aryl, and $C_1$-$C_4$ alkoxy. Non-limiting examples of aliphatic and cycloaliphatic dicarboxylic acids include malonic, succinic, glutaric, adipic, pimelic, azelaic, sebacic, fumaric, 2,2-dimethyl glutaric, suberic, 1,3-cyclopentanedicarboxylic, 1,4-cyclohexanedicarboxylic, 1,3-cyclohexanedicarboxylic, diglycolic, itaconic, maleic, and 2,5-norbornanedicarboxylic. The polymerization is catalyzed by a catalyst, such as a titanium-based catalyst (e.g., tetraisopropyltitanate, tetraisopropoxy titanium, dibutoxydiacetoacetoxy titanium, or tetrabutyltitanate).

If desired, a diisocyanate chain extender may be reacted with the aliphatic polyester prepolymer to increase its molecular weight. Representative diisocyanates may include toluene 2,4-diisocyanate, toluene 2,6-diisocyanate, 2,4'-diphenylmethane diisocyanate, naphthylene-1,5-diisocyanate, xylylene diisocyanate, hexamethylene diisocyanate ("HMDI"), isophorone diisocyanate and methylenebis(2-isocyanatocyclohexane). Trifunctional isocyanate compounds may also be employed that contain isocyanurate and/or biurea groups with a functionality of not less than three, or to replace the diisocyanate compounds partially by tri- or polyisocyanates. The preferred diisocyanate is hexamethylene diisocyanate. The amount of the chain extender employed is typically from about 0.3 to about 3.5 wt. %, in some embodiments, from about 0.5 to about 2.5 wt. % based on the total weight percent of the polymer.

The aliphatic polyesters may either be a linear polymer or a long-chain branched polymer. Long-chain branched polymers are generally prepared by using a low molecular weight branching agent, such as a polyol, polycarboxylic acid, hydroxy acid, and so forth. Representative low molecular weight polyols that may be employed as branching agents include glycerol, trimethylolpropane, trimethylolethane, polyethertriols, glycerol, 1,2,4-butanetriol, pentaerythritol, 1,2,6-hexanetriol, sorbitol, 1,1,4,4,-tetrakis (hydroxymethyl) cyclohexane, tris(2-hydroxyethyl) isocyanurate, and dipentaerythritol. Representative higher molecular weight polyols (molecular weight of 400 to 3000) that may be used as branching agents include triols derived by condensing alkylene oxides having 2 to 3 carbons, such as ethylene oxide and propylene oxide with polyol initiators. Representative polycarboxylic acids that may be used as branching agents include hemimellitic acid, trimellitic (1,2,4-benzenetricarboxylic) acid and anhydride, trimesic (1,3,5-benzenetricarboxylic) acid, pyromellitic acid and anhydride, benzenetetracarboxylic acid, benzophenone tetracarboxylic acid, 1,1,2,2-ethanetetracarboxylic acid, 1,1,2-ethanetricarboxylic acid, 1,3,5-pentanetricarboxylic acid, and 1,2,3,4-cyclopentanetetracarboxylic acid. Representative hydroxy acids that may be used as branching agents include malic acid, citric acid, tartaric acid, 3-hydroxyglutaric acid, mucic acid, trihydroxyglutaric acid, 4-carboxyphthalic anhydride, hydroxyisophthalic acid, and 4-(beta-hydroxyethyl)phthalic acid. Such hydroxy acids contain a combination of 3 or more hydroxyl and carboxyl groups. Especially preferred branching agents include trimellitic acid, trimesic acid, pentaerythritol, trimethylol propane and 1,2,4-butanetriol.

Polycaprolactone polymers may also be used in the present invention. Polycaprolactone polymers are generally prepared by the polymerization of ε-caprolactone, which is a seven-member ring compound that is characterized by its reactivity. Cleavage usually takes place at the carbonyl group. Higher molecular weight polycaprolactone may be prepared under the influence of a wide variety of catalysts, such as aluminum alkyls, organometallic compositions, such as Group IA, IIA, IIB, or IIIA metal alkyls, Grignard reagents, Group II metal dialkyls, calcium or other metal amides or alkyl amides, reaction products of alkaline earth hexamoniates, alkaline oxides and acetonitrile, aluminum trialkoxides, alkaline earth aluminum or boron hydrides, alkaline metal or alkaline earth hydrides or alkaline metals alone. An initiator may also be used in the preparation of polycaprolactone, such as an aliphatic diol that forms a terminal end group. Examples of polycaprolactone polymers that may be suitable for use in the present invention include a variety of polycaprolactone polymers that are available from Union Carbide Corporation, Somerset, N.J., under the designation TONE™ Polymer P767E and TONE™ Polymer P787 polycaprolactone polymers.

The low melting point aliphatic polyesters described above are primarily aliphatic in nature, i.e., the monomer constituents are primarily aliphatic, to optimize biodegradability. For example, the low melting point aliphatic polyesters typically contain at least about 50 mol. %, in some embodiments at least about 60 mol. %, and in some embodiments, at least about 70 mol. % of aliphatic monomer(s). Although primarily aliphatic in nature, the low melting point polyesters may nevertheless contain a minor portion of other monomer constituents, such as aromatic monomers (e.g., terephthalic acid) that further improve the strength and tenacity of the fibers. When utilized, the aromatic monomers may, for example, constitute from about 1 mol. % to about 50 mol. %, in some embodiments from about 10 mol. % to about 40 mol. %, and in some embodiments, from about 15 mol. % to about 30 mol. % of the low melting point aliphatic polyester. One particular example of an aliphatic polyester containing an aromatic terephthalic acid monomer (~22 mol. %) constituent is available under the designation Ecoflex™ F BX 7011 from BASF Corp. Another example of an aliphatic polyester containing an aromatic terephthalic acid monomer (~25 mol. %) constituent is available under the designation Enpol™ 8060M from IRE Chemicals (South Korea).

Regardless of their particular type, the present inventors have discovered that "low melting point" aliphatic polyesters having a certain combination of thermal and mechanical properties may provide improved processability and strength. For example, aliphatic polyesters having too great of a molecular weight generally possess heavily entangled polymer chains and thus result in a thermoplastic composition that is difficult to process. Conversely, aliphatic polyesters having too low of a molecular weight do not generally possess enough entanglement, which leads to a relatively weak melt strength. Thus, the "low melting point" aliphatic polyesters employed in the present invention typically have a number average molecular weight ("$M_n$") ranging from about 30,000 to about 120,000 Daltons, in some embodiments from about 40,000 to about 100,000 Daltons, and in some embodiments, from about 45,000 to about 85,000 Daltons. Likewise, the "low melting point" aliphatic polyesters also typically have a weight average molecular weight ("$M_w$") ranging from about 30,000 to about 240,000 Daltons, in some embodiments from about 50,000 to about 190,000 Daltons, and in some embodiments, from about 60,000 to about 105,000 Daltons. The molecular weight distribution of the selected polymers is also relatively narrow to enhance polymer processing and provide more consistent properties. That is, the ratio of the weight average molecular weight to the number average molecular weight ("$M_w/M_n$"), i.e., the "polydispersity index", is relatively low. For example, the polydispersity index typically ranges from about 1.0 to about 3.0, in some embodiments from about 1.2 to about 2.0, and in some embodiments, from about 1.4 to about 1.8. The weight and number average molecular weights may be determined by methods known to those skilled in the art.

To provide improved processability, the "low melting point" aliphatic polyester is also selected to have an apparent viscosity within a certain range. More specifically, aliphatic polyesters having too great of an apparent viscosity will generally be difficult to process. On the other hand, aliphatic polyesters having too low of an apparent viscosity will generally result in an extruded fiber lacking tensile strength and sufficient bonding capacity. Thus, in most embodiments, the "low melting point" aliphatic polyester has an apparent viscosity of from about 20 to about 215 Pascal seconds (Pa·s), in some embodiments from about 30 to about 200 Pa·s, and in some embodiments, from about 40 to about 150 Pa·s, as determined at a temperature of 160° C. and a shear rate of 1000 sec$^{-1}$. The present inventors have discovered that the particular combination of molecular weight and viscosity set forth above results in polymers having enhanced processability without adversely affecting the strength and bonding capacity of the resulting fiber.

The melt flow index of the "low melting point" aliphatic polyesters may also be selected within a certain range to optimize the properties of the resulting fibers. The melt flow index is the weight of a polymer (in grams) that may be forced through an extrusion rheometer orifice (0.0825-inch diameter) when subjected to a force of 2160 grams in 10 minutes at 190° C. Generally speaking, the melt flow index is high enough to improve melt processability, but not so high as to adversely interfere with the binding properties of the fibers. Thus, in most embodiments of the present invention, the "low melting point" aliphatic polyesters have a melt flow index of from about 5 to about 2000 grams per 10 minutes, in some embodiments from about 15 to about 1800 grams per 10 minutes, and in some embodiments, from about 20 to about 1500 grams per 10 minutes, measured in accordance with ASTM Test Method D1238-E.

The crystallinity of the aliphatic polyester also influences the properties of the resulting multicomponent fibers. That is, polymers having a higher degree of melt and crystallization enthalpy are more readily incorporated into bonded web products. For example, such polymers are more readily able to bond at higher speeds and also have a lower degree of shrinkage, thereby improving web stability, tensile strength, and web aesthetics. Thus, the aliphatic polyesters are typically selected to have a degree of crystallinity or latent heat of fusion ($\Delta H_f$) of greater than about 25 Joules per gram ("J/g"), in some embodiments greater than about 35 J/g, and in some embodiments, greater than about 50 J/g. Likewise, the aliphatic polyesters are also typically selected to have a latent heat of crystallinity ($\Delta H_c$) of greater than about 35 Joules per gram ("J/g"), in some embodiments greater than about 50 J/g, and in some embodiments, greater than about 60 J/g.

One difficulty encountered in the thermal processing of aliphatic polyester polymers into fibers is the sticky nature of these polymers. Attempts to draw the fibers, either mechanically, or through an air drawing process, will often result in the aggregation of the fibers into a solid mass. Thus, in accordance with the present invention, the "low melting point" aliphatic polyesters are also selected to have a relatively high crystallization temperature ("$T_c$"), thereby reducing tackiness. Specifically, the crystallization temperature may range from about 40° C. to about 100° C., in some embodiments from about 50° C. to about 90° C., and in some embodiments, from about 60° C. to about 80° C. As discussed in more detail below, the latent heat of fusion ($\Delta H_f$), latent heat of crystallization ($\Delta H_c$), and crystallization temperature may all be determined using differential scanning calorimetry ("DSC") in accordance with ASTM D-3417.

The particular low melting point aliphatic polyester selected generally depends on the nonwoven layer (e.g., spunbond or meltblown) in which it is employed. One function of the spunbond layer(s), for instance, is to provide strength and integrity to the nonwoven laminate. In this regard, the ability to produce strong, yet soft filaments may be facilitated through the use of a low melting point aliphatic polyester having a relatively low melt flow rate and high apparent viscosity. For example, the spunbond filaments may be formed from an aliphatic polyester having a melt flow index at the lower end of the range specified above, such as from about 5 to about 200 grams per 10 minutes, in some embodiments from about 15 to about 160 grams per 10 minutes, and in some embodiments, from about 20 to about 120 grams per 10 minutes, measured in accordance with ASTM Test Method D1238-E. Likewise, the aliphatic polyester may have an apparent viscosity at the higher end of the range specified above, such as from about 50 to about 215 Pascal seconds (Pa·s), in some embodiments from about 75 to about 200 Pa·s, and in some embodiments, from about 80 to about 150 Pa·s, as determined at a temperature of 160° C. and a shear rate of 1000 sec$^{-1}$. In particular embodiments of the present invention, for instance, polybutylene succinate copolyesters are used to form the spunbond filaments. One specific example of a suitable polybutylene succinate polymer is commercially available from IRE Chemicals (South Korea) under the designation Enpol™ G4500J.

In contrast, a primary function of the meltblown layer is to provide improved barrier properties to the nonwoven laminate. That is, the fibers of the meltblown layer form a structure having a small average pore size to inhibit the passage of liquids and particles, while allowing gases (e.g., air and water vapor) to pass therethrough. To achieve the desired pore size, the meltblown fibers are typically "microfibers" in that they have an average size of 10 micrometers or less, in some embodiments about 7 micrometers or less, and in some embodiments, about 5 micrometers or less. The ability to produce such fine fibers is facilitated through the use of a low melting point aliphatic polyester having a relatively high melt flow rate and low apparent viscosity. For example, the meltblown microfibers may be formed from an aliphatic polyester having a melt flow index at the higher end of the range specified above, such as from about 40 to about 2000 grams per 10 minutes, in some embodiments from about 60 to about 1800 grams per 10 minutes, and in some embodiments, from about 125 to about 1500 grams per 10 minutes, measured in accordance with ASTM Test Method D1238-E. Likewise, the aliphatic polyester may have an apparent viscosity at the lower end of the range specified above, such as from about 20 to about 150 Pascal seconds (Pa·s), in some embodiments from about 30 to about 120 Pa·s, and in some embodiments, from about 40 to about 100 Pa·s, as determined at a temperature of 160° C. and a shear rate of 1000 sec$^{-1}$. In particular embodiments of the present invention, for instance, polybutylene succinate copolyesters are used to form the meltblown microfibers. One specific example of a suitable polybutylene succinate polymer is commercially available from IRE Chemicals (South Korea) under the designation Enpol™ G4500 (Grade 1DF241).

A beneficial aspect of the present invention is that the above-described thermal and mechanical properties of the "low melting point" aliphatic polyesters may be provided without the need for conventional additives. For example, many conventional biodegradable thermoplastic compositions require the use of a nucleating agent to improve processing and to facilitate crystallization during quenching. One type of such a nucleating agent is a multi-carboxylic acid, such as succinic acid, glutaric acid, adipic acid, pimelic acid, suberic acid, azelaic acid, sebacic acid, and mixtures of such acids, as described in U.S. Pat. No. 6,177,193 to Tsai, et al.

The present inventors have discovered, however, that through the careful selection of an aliphatic polyester having certain thermal and physical properties, such nucleating agents are not necessarily required. In fact, the present inventors have discovered that excellent results may be achieved using aliphatic polyesters as the principal ingredient of a "low melting" point aliphatic polyester component of the fibers. That is, the aliphatic polyesters may constitute at least about 90 wt. %, in some embodiments at least about 92 wt. %, and in some embodiments, at least about 95 wt. % of the "low melting" point aliphatic polyester component. In such embodiments, the characteristics of the low melting point aliphatic polyester component (e.g., melting point, glass transition temperature, apparent viscosity, molecular weight, etc.) will be substantially the same as the characteristics of the aliphatic polyesters employed. For example, the melting point of the component may range from about 50° C. to about 160° C., in some embodiments from about 80° C. to about 160° C., and in some embodiments, from about 100° C. to about 140° C. Nevertheless, it should be understood that nucleating agents may be used in some embodiments of the present invention. When utilized, however, the nucleating agents are typically present in an amount of less than about 0.5 wt. %, in some embodiments less than about 0.25 wt. %, and in some embodiments, less than about 0.1 wt. % of the "low melting" point aliphatic polyester component.

Although aliphatic polyesters are the primary ingredient of the "low melting" point aliphatic polyester component, other ingredients may of course be utilized for a variety of different reasons. For instance, a wetting agent may be employed in some embodiments of the present invention to improve the hydrophilicity of the resulting fibers. Wetting agents suitable for use in the present invention are generally compatible with the aliphatic polyesters. Examples of suitable wetting agents may include surfactants, such as UNITHOX® 480 and UNITHOX® 750 ethoxylated alcohols, or UNICID™ acid amide ethoxylates, all available from Petrolite Corporation of Tulsa, Okla. Other suitable wetting agents are described in U.S. Pat. No. 6,177,193 to Tsai, et al., which is incorporated herein in its entirety by reference thereto for all relevant purposes. Still other materials that may be used include, without limitation, pigments, antioxidants, stabilizers, surfactants, waxes, flow promoters, solid solvents, plasticizers, particulates, and other materials added to enhance processability. When utilized, it is normally desired that the amounts of these additional ingredients are minimized to ensure optimum compatibility and cost-effectiveness. Thus, for example, it is normally desired that such ingredients constitute less than about 10 wt. %, in some embodiments less than about 8 wt. %, and in some embodiments, less than about 5 wt. % of the "low melting" point aliphatic polyester component.

Generally speaking, the fibers used in the nonwoven layers of the multi-laminate may have any desired configuration (e.g., monocomponent, multicomponent, or multiconstituent). The particular configuration of the fibers generally depends on the nonwoven layer (e.g., spunbond or meltblown) in which they are employed. In some embodiments, for instance, the spunbond filaments may also contain one or more strength-enhancing polymers as a component (e.g., bicomponent) or constituent (e.g., biconstituent) to further enhance the strength and other mechanical properties of the spunbond layer. The strength-enhancing polymers may, for instance, be a thermoplastic polymer that is not generally considered biodegradable, such as polyolefins, e.g., polyethylene, polypropylene, polybutylene, and so forth; polytetrafluoroethylene; polyesters, e.g., polyethylene terephthalate, and so forth; polyvinyl acetate; polyvinyl chloride acetate; polyvinyl butyral; acrylic resins, e.g., polyacrylate, polymethylacrylate, polymethylmethacrylate, and so forth; polyamides, e.g., nylon; polyvinyl chloride; polyvinylidene chloride; polystyrene; polyvinyl alcohol; and polyurethanes.

More desirably, however, the strength-enhancing polymers are biodegradable. For example, the strength-enhancing polymer may be a "high melting point" aliphatic polyester having a melting point of from about 160° C. to about 250° C., in some embodiments from about 170° C. to about 240° C., and in some embodiments, from about 180° C. to about 220° C. The melting point is typically at least about 30° C., in some embodiments at least about 40° C., and in some embodiments, at least about 50° C. more than the melting point of the "low melting point" aliphatic polyesters. The glass transition temperature ("$T_g$") of the high melting point polyesters may be at least about 5° C., in some embodiments at least about 10° C., and in some embodiments, at least about 15° C. more than the glass transition temperature of the low melting point polyesters. Various "high melting point" aliphatic polyesters may be employed in the present invention, such as polyesteramides, modified polyethylene terephthalate, polylactic acid (PLA), terpolymers based on polylactic acid, polyglycolic acid, polyalkylene carbonates (such as polyethylene carbonate), polyhydroxyalkanoates (PHA), polyhydroxybutyrates (PHB), polyhydroxyvalerates (PHV), and polyhydroxybutyrate-hydroxyvalerate copolymers (PHBV). The term "polylactic acid" generally refers to homopolymers of lactic acid, such as poly(L-lactic acid), poly(D-lactic acid), poly(DL-lactic acid), mixtures thereof, and copolymers containing lactic acid as the predominant component and a small proportion of a copolymerizable comonomer, such as 3-hydroxybutyrate, caprolactone, glycolic acid, etc. Any known polymerization method, such as polycondensation or ring-opening polymerization, may be used to polymerize lactic acid. In the polycondensation method, for example, L-lactic acid, D-lactic acid, or a mixture thereof is directly subjected to dehydro-polycondensation. In the ring-opening polymerization method, a lactide that is a cyclic dimer of lactic acid is subjected to polymerization with the aid of a polymerization-adjusting agent and catalyst. The lactide may include L-lactide (a dimer of L-lactic acid), D-lactide (a dimer of D-lactic acid), DL-lactide (a condensate of L-lactic acid and D-lactic acid), or mixtures thereof. These isomers may be mixed and polymerized, if necessary, to obtain polylactic acid having any desired composition and crystallinity. A small amount of a chain-extending agent (e.g., a diisocyanate compound, an epoxy compound or an acid anhydride) may also be employed to increase the molecular weight of the polylactic acid. The weight average molecular weight of the polylactic acid is generally within the range of about 60,000 to about 1,000,000. One particularly suitable polylactic acid polymer is commercially available from Biomer, Inc. (Germany) under the name Biomer™ L9000. Still other suitable polylactic acid polymers are commercially available from Natureworks, LLC of Minneapolis, Minn.

In one particular embodiment, the spunbond layer is formed from multicomponent filaments containing a first component formed from one or more low melting point aliphatic polyesters and a second component formed from one or more high melting point aliphatic polyesters, such as described above. Although not required, the additional polymers (e.g., high melting point aliphatic polyesters) may constitute the principal ingredient of the second component. That is, the polymers may constitute at least about 90 wt. %, in some embodiments at least about 92 wt. %, and in some embodiments, at least about 95 wt. % of the first component. In such embodiments, the characteristics of the second component (e.g., melting point) will be substantially the same as the characteristics of the aliphatic polyesters employed. For example, the melting point of the second component may range from about 160° C. to about 250° C., in some embodiments from about 170° C. to about 240° C., and in some embodiments, from about 180° C. to about 220° C. Regardless, the relative amount of the first component may constitute from about 5 wt. % to about 95 wt. %, in some embodiments from about 10 wt. % to about 90 wt. %, and in some embodiments, from about 15 wt. % to about 85 wt. % of the multicomponent filaments. Likewise, the second component may constitute from about 5 wt. % to about 95 wt. %, in some embodiments from about 10 wt. % to about 90 wt. %, and in some embodiments, from about 15 wt. % to about 85 wt. % of the multicomponent filaments. Through this combination of components, the resulting filaments are substantially biodegradable, yet readily processed into fibrous structures that exhibit good mechanical properties.

Similar to the spunbond filaments, the meltblown microfibers may also include one or more strength-enhancing polymers as a component or constituent. In one embodiment, for instance, the meltblown layer is formed from multicomponent microfibers containing a first component formed from one or more low melting point aliphatic polyesters and a second component formed from one or more high melting point aliphatic polyesters, such as described above. However, the meltblown layer need always not possess the same degree of strength as the spunbond layer, and may be made without a strength-enhancing polymer to improve the processability of the laminate. For example, monocomponent meltblown fibers may be used that are formed from a low melting point aliphatic polyester.

The fibers of the present invention may constitute the entire fibrous component of a nonwoven layer or blended with other types of fibers (e.g., staple fibers, filaments, etc). For example, additional monocomponent, multicomponent, and/or multiconstituent fibers may be utilized in the present invention. Some suitable polymers that may be used to form the synthetic fibers include, but are not limited to: polyolefins, e.g., polyethylene, polypropylene, polybutylene, and so forth; polytetrafluoroethylene; polyesters, e.g., polyethylene terephthalate and the like; polyvinyl acetate; polyvinyl chloride acetate; polyvinyl butyral; acrylic resins, e.g., polyacrylate, polymethylacrylate, polymethylmethacrylate, and so forth; polyamides, e.g., nylon; polyvinyl chloride; polyvinylidene chloride; polystyrene; polyvinyl alcohol; and polyurethanes. If desired, biodegradable polymers, such as poly (glycolic acid) (PGA), poly(lactic acid) (PLA), poly(β-malic acid) (PMLA), poly(ε-caprolactone) (PCL), poly(p-dioxanone) (PDS), and poly(3-hydroxybutyrate) (PHB). Some examples of known synthetic fibers include sheath-core bicomponent fibers available from KoSa Inc. of Charlotte, N.C. under the designations T-255 and T-256, both of which use a polyolefin sheath, or T-254, which has a low melt co-polyester sheath. Still other known bicomponent fibers that may be used include those available from the Chisso Corporation of Moriyama, Japan or Fibervisions LLC of Wilmington, Del. Synthetic or natural cellulosic polymers may also be used, including but not limited to, cellulosic esters; cellulosic ethers; cellulosic nitrates; cellulosic acetates; cellulosic acetate butyrates; ethyl cellulose; regenerated celluloses, such as viscose, rayon, and so forth. When blended with other types of fibers, it is normally desired that the fibers of the present invention constitute from about 20 wt % to about 95 wt. %, in some embodiments from about 30 wt. % to about 90 wt. %, and in some embodiments, from about 40 wt. % to about 80 wt. % of the total amount of fibers employed in a given nonwoven layer.

The techniques used to form the nonwoven laminate generally depend on the desired configuration. In one embodiment, for example, the nonwoven laminate contains a meltblown layer positioned between two spunbond layers to form a spunbond/meltblown/spunbond ("SMS") laminate. One of the spunbond layers is formed from biodegradable polymer(s), such as described above. The other spunbond layer may be formed from biodegradable polymer(s) and/or any other polymer (e.g., polyolefins). Various techniques for forming SMS laminates are described in U.S. Pat. No. 4,041,203 to Brock et al.; U.S. Pat. No. 5,213,881 to Timmons, et al.; U.S. Pat. No. 5,464,688 to Timmons, et al.; U.S. Pat. No. 4,374,888 to Bornslaeger; U.S. Pat. No. 5,169,706 to Collier, et al.; and U.S. Pat. No. 4,766,029 to Brock et al., as well as U.S. Patent Application Publication No. 2004/0002273 to Fitting, et al., all of which are incorporated herein in their entirety by reference thereto for all purposes. Of course, the nonwoven laminate may have other configuration and possess any desired number of meltblown and spunbond layers, such as spunbond/meltblown/meltblown/spunbond laminates ("SMMS"), spunbond/meltblown laminates ("SM"), etc.

Referring to FIG. 1, one embodiment of a forming machine 10 is shown for producing an SMS laminate 12 having a meltblown layer 32 positioned between spunbond layers 28 and 36. The forming machine 10 includes an endless foraminous surface 14 (e.g., belt) wrapped around rollers 16 and 18 so that the surface 14 is driven in the direction shown by the arrows. In this embodiment, the illustrated forming machine 10 employs a first spunbond station 20, a meltblown station 22, and a second spunbond station 24. Alternatively, one or more of the laminate layers may be formed separately, rolled, and later converted to the laminate 12.

The spunbond stations 20 and 24 may each employ one or more conventional extruders. For example, in one embodiment, multicomponent filaments 26 and 34 may be formed by separately extruding a first component A (i.e., "high melting point" polymer component) and a second component B (i.e., "high melting point" polymer component) in two extruders (not shown). The extrusion temperature may generally vary depending on the type of polymers employed. For instance, the extruder for Component B ("low melting point" polyester) may employ one or multiple zones operating at a temperature of from about 120° C. to about 200° C., and in some embodiments, from about 145° C. to about 195° C. Likewise, the extruder for Component A ("high melting point" polyester) may employ one or multiple zones operating at a temperature of from about 160° C. to about 250° C., and in some embodiments, from about 190° C. to about 225° C. Typical shear rates range from about 100 seconds$^{-1}$ to about 10,000 seconds$^{-1}$, in some embodiments from about 500 seconds$^{-1}$ to about 5000 seconds$^{-1}$, and in some embodiments, from about 800 seconds$^{-1}$ to about 1200 seconds$^{-1}$.

The components A and B are fed from the extruders ("co-extruded") through respective polymer conduits to a spinneret (not shown). Spinnerets are well known to those of skill in the art. In one embodiment, the spinneret may include a housing containing a spin pack having a plurality of plates stacked one on top of each other and having a pattern of openings arranged to create flow paths for directing polymer components A and B separately therethrough. The spinneret may also have openings arranged in one or more rows. The openings form a downwardly extruding curtain of filaments when the polymers are extruded therethrough. A quench blower (not shown) may be positioned adjacent the curtain of filaments extending from the spinneret. Air from the quench air blower quenches the filaments extending from the spinneret. The quench air may be directed from one side of the filament curtain or both sides of the filament curtain. Such a process generally reduces the temperature of the extruded polymers at least about 100° C. over a relatively short time frame (seconds). This will generally reduce the temperature change needed upon cooling, to preferably be less than 150° C. and, in some cases, less than 100° C. The ability to use relatively low extruder temperature also allows for the use of lower quenching temperatures. For example, the quench blower may employ one or more zones operating at a temperature of from about 20° C. to about 100° C., and in some embodiments, from about 25° C. to about 60° C.

After quenching, the filaments are drawn into the vertical passage of the fiber draw unit by a flow of a gas such as air, from a heater or blower through the fiber draw unit. The flow of gas causes the filaments to draw or attenuate which increases the molecular orientation or crystallinity of the polymers forming the filaments. Fiber draw units or aspirators for use in melt spinning polymers are well known in the art. Suitable fiber draw units for use in the process of the present invention include a linear fiber aspirator of the type shown in U.S. Pat. Nos. 3,802,817 and 3,423,255, which are incorporated herein in their entirety by reference thereto for all relevant purposes. Thereafter, the filaments are deposited through the outlet opening of the fiber draw unit and onto the foraminous surface 14 to form the spunbond layers 28.

Referring again to FIG. 1, the meltblown station 22 includes a single die tip, although other meltblown die tips may of course be employed. As the polymer exits the die, high pressure fluid (e.g., heated air) attenuates and spreads the polymer stream into microfibers 30. The microfibers 30 are randomly deposited onto the spunbond layer 28 to form the meltblown layer 32. The distance between the die tip and the foraminous surface 14 is generally small to improve the uniformity of the fiber laydown. For example, the distance may be from about 1 to about 6 centimeters. After the meltblown layer 32 is deposited, the spunbond station 24 deposits spunbond filaments 34 onto the meltblown layer 32 as described above to produce the spunbond layer 36.

Once formed, the nonwoven laminate is then bonded using any conventional technique, such as with an adhesive or autogenously (e.g., fusion and/or self-adhesion of the fibers without an applied external adhesive). Autogenous bonding, for instance, may be achieved through contact of the fibers while they are semi-molten or tacky, or simply by blending a tackifying resin and/or solvent with the aliphatic polyester(s) used to form the fibers. Suitable autogenous bonding techniques may include ultrasonic bonding, thermal bonding, through-air bonding, and so forth.

In FIG. 1, for instance, the SMS laminate passes through a nip formed between a pair of rolls 38 and 40, one or both of which are heated to melt-fuse the fibers. One or both of the rolls 38 and 40 may also contain intermittently raised bond points to provide an intermittent bonding pattern. The pattern of the raised points is generally selected so that the nonwoven laminate has a total bond area of less than about 50% (as determined by conventional optical microscopic methods), and in some embodiments, less than about 30%. Likewise, the bond density is also typically greater than about 100 bonds per square inch, and in some embodiments, from about 250 to about 500 pin bonds per square inch. Such a combination of total bond area and bond density may be achieved by bonding the web with a pin bond pattern having more than about 100 pin bonds per square inch that provides a total bond surface area less than about 30% when fully contacting a smooth anvil roll. In some embodiments, the bond pattern may have a pin bond density from about 250 to about 350 pin bonds per square inch and a total bond surface area from about 10% to about 25% when contacting a smooth anvil roll. Exemplary bond patterns include, for instance, those described in U.S. Pat. No. 3,855,046 to Hansen et al., U.S. Pat. No. 5,620,779 to Levy et al., U.S. Pat. No. 5,962,112 to Haynes et al., U.S. Pat. No. 6,093,665 to Sayovitz et al., U.S. Design Pat. No. 428, 267 to Romano et al. and U.S. Design Pat. No. 390,708 to Brown, which are incorporated herein in their entirety by reference thereto for all purposes. One embodiment of the SMS laminate 12 formed according to the process shown in FIG. 1 is shown in greater detail in FIG. 2. As illustrated, the meltblown layer 32 is positioned between two spunbond layers 28 and 36. Further, the laminate 12 also contains a pattern of discrete bond areas 41.

Due to the particular rheological and thermal properties of the polymers used to form the spunbond and meltblown layers, the bonding conditions (e.g., temperature and nip pressure) may be specifically selected to cause the low melting point aliphatic polyester of each layer to melt and flow. For example, the bonding temperature (e.g., the temperature of the rollers 38 and 40) may be relatively low, such as from about 50° C. to about 160° C., in some embodiments from about 80° C. to about 160° C., and in some embodiments, from about 100° C. to about 140° C. Likewise, the nip pressure may range from about 5 to about 150 pounds per square inch, in some embodiments, from about 10 to about 100 pounds per square inch, and in some embodiments, from about 30 to about 60 pounds per square inch. When bonded in this manner, the low melting point polymers of the meltblown and spunbond layers may fuse together. However, due in part to the high melt flow index and low apparent viscosity of the aliphatic polyester used to form the microfibers, the meltblown layer is able to retain its integrity after bonding. Bonding also does not substantially melt any high melting point aliphatic polyesters used in the laminate.

As a result of the present invention, the nonwoven laminate may exhibit enhanced strength and toughness. For example, the laminate may exhibit a relatively high "peak load", which indicates the maximum load to break as expressed in units of grams-force per inch. The MD peak load of the web may, for instance, be at least about 5000 grams-force ("$g_f$"), in some embodiments at least about 8000 $g_f$, and in some embodiments, at least about 10,000 $g_f$. The CD peak load may also be at least about 1200 grams-force ("$g_f$"), in some embodiments at least about 1500 $g_f$, and in some embodiments, at least about 2500 $g_f$. In addition, the nonwoven laminate is also capable of exhibiting improved "peak elongation" properties, i.e., the percent elongation of the web at its peak load. For example, the nonwoven laminate of the present invention may exhibit a machine direction ("MD") peak elongation of at least about 10%, in some embodiments at least about 20%, and in some embodiments, at least about 35%. The nonwoven laminate may also exhibit a cross-machine direction ("CD") peak elongation of at least about 35%, in some embodiments at least about 45%, and in some embodiments, at least about 50%. Of course, in addition to possessing good mechanical properties, the nonwoven laminate of the present invention is also soft, drapable, and tactile.

If desired, the nonwoven laminate of the present invention may be applied with various treatments to impart desirable characteristics. For example, the laminate may be treated with liquid-repellency additives, antistatic agents, surfactants, colorants, antifogging agents, fluorochemical blood or alcohol repellents, lubricants, and/or antimicrobial agents. In addition, the laminate may be subjected to an electret treatment that imparts an electrostatic charge to improve filtration efficiency. The charge may include layers of positive or negative charges trapped at or near the surface of the polymer, or charge clouds stored in the bulk of the polymer. The charge may also include polarization charges that are frozen in alignment of the dipoles of the molecules. Techniques for subjecting a fabric to an electret treatment are well known by those skilled in the art. Examples of such techniques include, but are not limited to, thermal, liquid-contact, electron beam and corona discharge techniques. In one particular embodiment, the electret treatment is a corona discharge technique, which involves subjecting the laminate to a pair of electrical fields that have opposite polarities. Other methods for forming an electret material are described in U.S. Pat. No. 4,215,682 to Kubik. et al.; U.S. Pat. No. 4,375,718 to Wadsworth; U.S. Pat. No. 4,592,815 to Nakao; U.S. Pat. No. 4,874,659 to Ando; U.S. Pat. No. 5,401,446 to Tsai, et al.; U.S. Pat. No. 5,883,026 to Reader, et al.; U.S. Pat. No. 5,908,598 to Rousseau, et al.; U.S. Pat. No. 6,365,088 to Knight, et al., which are incorporated herein in their entirety by reference thereto for all purposes.

The nonwoven laminate of the present invention may be used in a wide variety of applications. For example, the laminate may be incorporated into a "medical product", such as gowns, surgical drapes, facemasks, head coverings, surgical caps, shoe coverings, sterilization wraps, warming blankets, heating pads, and so forth. Of course, the nonwoven laminate may also be used in various other articles. For example, the nonwoven laminate may be incorporated into an "absorbent article" that is capable of absorbing water or other fluids.

Examples of some absorbent articles include, but are not limited to, personal care absorbent articles, such as diapers, training pants, absorbent underpants, incontinence articles, feminine hygiene products (e.g., sanitary napkins), swim wear, baby wipes, mitt wipe, and so forth; medical absorbent articles, such as garments, fenestration materials, underpads, bedpads, bandages, absorbent drapes, and medical wipes; food service wipers; clothing articles; pouches, and so forth. Materials and processes suitable for forming such articles are well known to those skilled in the art. Absorbent articles, for instance, typically include a substantially liquid-impermeable layer (e.g., outer cover), a liquid-permeable layer (e.g., bodyside liner, surge layer, etc.), and an absorbent core. In one embodiment, for example, the nonwoven laminate of the present invention may be used to form an outer cover of an absorbent article.

Although the basis weight of the nonwoven laminate of the present invention may be tailored to the desired application, it generally ranges from about 10 to about 300 grams per square meter ("gsm"), in some embodiments from about 25 to about 200 gsm, and in some embodiments, from about 40 to about 150 gsm.

The present invention may be better understood with reference to the following examples.

Test Methods

Molecular Weight:

The molecular weight distribution of a polymer was determined by gel permeation chromatography ("GPC"). The samples were initially prepared by adding 0.5% wt/v solutions of the sample polymers in chloroform to 40-milliliter glass vials. For example, 0.05±0.0005 grams of the polymer was added to 10 milliliters of chloroform. The prepared samples were placed on an orbital shaker and agitated overnight. The dissolved sample was filtered through a 0.45-micron PTFE membrane and analyzed using the following conditions:

| | |
|---|---|
| Columns: | Styragel HR 1, 2, 3, 4, & 5E (5 in series) at 41° C. |
| Solvent/Eluent: | Chloroform @1.0 milliliter per minute |
| HPLC: | Waters 600E gradient pump and controller, Waters 717 auto sampler |
| Detector: | Waters 2414 Differential Refractometer at sensitivity = 30, at 40° C. and scale factor of 20 |
| Sample Concentration: | 0.5% of polymer "as is" |
| Injection Volume: | 50 microliters |
| Calibration Standards: | Narrow MW polystyrene, 30-microliter injected volume. |

Number Average Molecular Weight ($MW_n$), Weight Average Molecular Weight ($MW_w$) and first moment of viscosity average molecular weight ($MW_z$) were obtained.

Apparent Viscosity:

The rheological properties of polymer samples were determined using a Göttfert Rheograph 2003 capillary rheometer with WinRHEO version 2.31 analysis software. The setup included a 2000-bar pressure transducer and a 30/1:0/180 roundhole capillary die. Sample loading was done by alternating between sample addition and packing with a ramrod. A 2-minute melt time preceded each test to allow the polymer to completely melt at the test temperature (usually 160 to 220° C.). The capillary rheometer determined the apparent viscosity (Pa·s) at seven different shear rates: 50, 100, 200, 500, 1000, 2000 and 5000 $s^{-1}$. The resultant rheology curve of apparent shear rate versus apparent viscosity gave an indication of how the polymer would run at that temperature in an extrusion process.

Melt Flow Index:

The melt flow index is the weight of a polymer (in grams) forced through an extrusion rheometer orifice (0.0825-inch diameter) when subjected to a force of 2160 grams in 10 minutes at 190° C. The melt flow index was measured in accordance with ASTM Test Method D1238-E.

Thermal Properties: (Melting Point, $T_g$, and % Crystallinity):

The melting temperature, glass transition temperature and degree of crystallinity of a material were determined by differential scanning calorimetry (DSC). The differential scanning calorimeter was a THERMAL ANALYST 2910 Differential Scanning Calorimeter, which was outfitted with a liquid nitrogen cooling accessory and with a THERMAL ANALYST 2200 (version 8.10) analysis software program, both of which are available from T.A. Instruments Inc. of New Castle, Del. To avoid directly handling the samples; tweezers or other tools were used. The samples were placed into an aluminum pan and weighed to an accuracy of 0.01 milligram on an analytical balance. A lid was crimped over the material sample onto the pan. Typically, the resin pellets were placed directly in the weighing pan, and the fibers were cut to accommodate placement on the weighing pan and covering by the lid.

The differential scanning calorimeter was calibrated using an indium metal standard and a baseline correction was performed, as described in the operating manual for the differential scanning calorimeter. A material sample was placed into the test chamber of the differential scanning calorimeter for testing, and an empty pan is used as a reference. All testing was run with a 55-cubic centimeter per minute nitrogen (industrial grade) purge on the test chamber. For resin pellet samples, the heating and cooling program was a 2-cycle test that began with an equilibration of the chamber to −25° C., followed by a first heating period at a heating rate of 10° C. per minute to a temperature of 200° C., followed by equilibration of the sample at 200° C. for 3 minutes, followed by a first cooling period at a cooling rate of 20° C. per minute to a temperature of −25° C., followed by equilibration of the sample at −25° C. for 3 minutes, and then a second heating period at a heating rate of 10° C. per minute to a temperature of 200° C. For fiber samples, the heating and cooling program was a 1-cycle test that began with an equilibration of the chamber to −25° C., followed by a heating period at a heating rate of 200° C. per minute to a temperature of 200° C., followed by equilibration of the sample at 200° C. for 3 minutes, and then a cooling period at a cooling rate of 10° C. per minute to a temperature of −25° C. All testing was run with a 55-cubic centimeter per minute nitrogen (industrial grade) purge on the test chamber.

The results were then evaluated using the THERMAL ANALYST 2200 analysis software program, which identified and quantified the glass transition temperature ($T_g$) of inflection, the endothermic and exothermic peaks, and the areas under the peaks on the DSC plots. The glass transition temperature was identified as the region on the plot-line where a distinct change in slope occurred, and the melting temperature was determined using an automatic inflection calculation. The areas under the peaks on the DSC plots were determined in terms of joules per gram of sample (J/g). For example, the endothermic heat of melting of a resin or fiber sample was determined by integrating the area of the endothermic peak. The area values were determined by converting the areas under the DSC plots (e.g. the area of the endotherm)

into the units of joules per gram (J/g) using computer software. The % crystallinity was calculated as follows:

% crystallinity=100*(A−B)/C wherein,

A is the sum of endothermic peak areas (J/g);

B is the sum of exothermic peak areas (J/g); and

C is the endothermic heat of melting value for the selected polymer where such polymer has 100% crystallinity (J/g). For polylactic acid, C is 93.7 J/g (Cooper-White, J. J., and Mackay, M. E., *Journal of Polymer Science*, Polymer Physics Edition, p. 1806, Vol. 37, (1999)). The areas under any exothermic peaks encountered in the DSC scan due to insufficient crystallinity were subtracted from the area under the endothermic peak to appropriately represent the degree of crystallinity.

Tensile Properties:

The strip tensile strength values were determined in substantial accordance with ASTM Standard D-5034. Specifically, a sample was cut or otherwise provided with size dimensions that measured 51 millimeters (width)×127 millimeters (length). A constant-rate-of-extension type of tensile tester was employed. The tensile testing system was a MTS SYNERGY 200 Tensile Tester, which is available from MTS Systems Corporation of Eden Prairie, Minn. The tensile tester was equipped with TESTWORKS 4.08B software from MTS Corporation to support the testing. An appropriate load cell was selected so that the tested value fell within the range of 10-90% of the full scale load. The sample was held between grips having a front and back face measuring 25.4 millimeters×76 millimeters. The grip faces were rubberized, and the longer dimension of the grip was perpendicular to the direction of pull. The grip pressure was pneumatically maintained at a pressure of 40 pounds per square inch. The tensile test was run at a 300-millimeter per minute rate with a gauge length of 76 millimeters and a break sensitivity of 40%.

Three samples were tested by applying the test load along the machine-direction and three samples were tested by applying the test load along the cross direction. In addition to tensile strength, the peak load, peak elongation (i.e., % elongation at peak load), and the energy to peak were measured. The peak strip tensile loads from each specimen tested were arithmetically averaged to determine the MD or CD tensile strength.

Peel Strength:

The peel strength is determined by holding the layers at facing edges and pulling the layers in opposite directions. This is commonly referred to as a "T-peel" because peeling results in the two separated portions of the tapes or laminates forming the arms of the letter "T" with the base of the letter "T" being the portion of the two tapes that remain attached until pulled apart. Peel strength may be determined in accordance with ASTM 5527. For instance, in the Examples, a "constant-rate-of-extension" tensile tester was employed. The tensile testing system was a MTS SYNERGY 200 Tensile Tester, which is available from MTS Systems Corporation of Eden Prairie, Minn. The tensile tester was equipped with TESTWORKS 4.08B software from MTS Corporation to support the testing. An appropriate load cell was selected so that the tested value fell within the range of 10-90% of the full scale load. The sample was held between grips having a front and back face measuring 25.4 millimeters×76 millimeters. The grip faces were rubberized, and the longer dimension of the grip was perpendicular to the direction of pull. The grip pressure was pneumatically maintained at a pressure of 40 pounds per square inch. Nonwoven laminate samples are cut into 25 millimeters×150 millimeters strips and two spunbond layers were very gently peeled by hand a distance of 13 millimeters, with each portion of the laminates inserted in the upper and lower sample grips respectively forming a "T" between the upper and lower grips. The gage length employed for the peel test was 38 millimeters and the test speed was set at 508 millimeters per minute. The peel force (load on cell) measurement was started at 13 millimeters and terminated at 51 millimeters, 102 millimeters, and 152 millimeters of travel of the upper jaw. The measured load was then averaged across the peel length to arrive at an average peel load. Multiple samples were read in this manner to arrive at an average peel load. High peel loads indicated a high degree of adhesion between the nonwoven components of the laminate.

Example 1

Various physical properties of the following aliphatic polyesters were tested.

P1: Polybutylene succinate obtained from IRE Chemicals, South Korea under the name EnPol™ G4500 (Grade CE272);

P2: Polybutylene succinate obtained from IRE Chemicals, South Korea under the name EnPol™ G4500 (Grade 1 DF241);

P3: Polybutylene succinate obtained from IRE Chemicals, South Korea under the name EnPol™ G4500 (Grade 2DF242);

P4: Polybutylene succinate obtained from IRE Chemicals, South Korea under the name EnPol™ G4560J;

P5: Polybutylene succinate obtained from IRE Chemicals, South Korea under the name EnPol™ G4500 (Grade CE272-High MFI);

P6: Polybutylene succinate obtained from IRE Chemicals, South Korea under the name EnPol™ G4500 (Grade CE272-Mid MFI);

P7: Polybutylene succinate obtained from Showa, Japan under the name Bionolle™ 1020;

P8: Polybutylene succinate obtained from Showa, Japan under the name Bionolle™ 1903;

P9: Polybutylene succinate obtained from Showa, Japan under the name Bionolle™ 1003;

P10: Polylactic acid obtained from Biomer Inc., Germany under the name Biomer™ L9000;

P11: Polylactic acid obtained from Natureworks, LLC under the name EcoPla™ 6201 D;

P12: Polylactic acid obtained from Natureworks, LLC under the name EcoPla™ 6300;

P13: Polylactic acid obtained from Natureworks, LLC under the name EcoPla™ 6200; and P14: PP3155 isotactic polypropylene homopolymer available from Exxon Mobil Chemicals Co.

The results are set forth below in Tables 1 and 2.

TABLE 1

Molecular Weight and Melt Properties

| Polymer | MW$_n$ | MW$_w$ | Polydispersity Index | Melt Flow Index (190° C., 2.16 kg) | Melt Temp (° C.) | Heat of Fusion, (J/g) | Crystallization Temp. (° C.) | Heat of Crystallization (J/g) |
|---|---|---|---|---|---|---|---|---|
| P1  | 78,000  | 126,900 | 1.63 | 47  | 114.95 | 49.45 | 79.08 | 57.86 |
| P2  | 59,500  | 99,200  | 1.67 | 150 | 114.94 | 64.26 | 70.86 | 62.38 |
| P3  | 72,300  | 122,900 | 1.70 | 41  | 115.03 | 59.69 | 75.13 | 61.26 |
| P4  | 77,600  | 142,900 | 1.84 | 25  | 114.40 | —     | —     | —     |
| P5  | 49,900  | 92,400  | 1.85 | 127 | 113.21 | 71.48 | 64.90 | 72.34 |
| P6  | 61,500  | 105,400 | 1.71 | 56  | 114.06 | 58.54 | 68.02 | 61.25 |
| P7  | —       | —       | —    | 28  | 114.28 | 56.88 | 76.36 | 64.13 |
| P8  | —       | —       | —    | —   | —      | —     | —     | —     |
| P9  | —       | —       | —    | 4.4 | —      | —     | —     | —     |
| P10 | 113.5   | 150.7   | 1.33 | 22 (210° C.) 43 (230° C.) | 169.60 | 3.70 | 71.38 | 33.46 |

TABLE 2

Rheological Properties (30/1/180 Roundhole)

| Apparent Shear Rate (sec$^{-1}$) | Apparent Viscosity (Pa-s) (at 160° C.) | | | | | | Apparent Viscosity (Pa-s) (at 220° C.) | | |
|---|---|---|---|---|---|---|---|---|---|
| | P4 | P2 | P3 | P7 | P8 | P9 | P4 | P10 | P3 |
| 50   | 407.1 | —    | —    | —   | —   | —   | 65.1 | —     | 98.0 |
| 100  | 325.7 | —    | —    | —   | —   | —   | 48.9 | —     | 73.3 |
| 200  | 268.7 | 86.0 | 212  | 395 | 578 | 973 | 44.8 | —     | 73.3 |
| 500  | 192.2 | 76.0 | 163  | 293 | 360 | 621 | 44.0 | 261.0 | 63.5 |
| 1000 | 141.7 | 66.0 | 129  | 217 | 241 | 416 | 39.0 | 195.4 | 44.8 |
| 2000 | —     | 53.3 | 95.3 | 148 | 157 | 248 | —    | 179.0 | —    |
| 5000 | —     | 37.0 | 57   | 80.8| 86.8| —   | —    | 168.0 | —    |

As indicated, the Bionolle™ polymers (P7-P9) were quite viscous compared to the EnPol™ G4500 polymers (P2-P4).

Example 2

Spunbond webs were formed for use in a multi-layer nonwoven laminate of the present invention. As indicated in Table 3 below, various combinations of polymers were tested. The polylactic acid and polybutylene succinate polymers were placed in separate desiccant driers and dried at temperature and time conditions within supplier recommendations. Each polymer was then pneumatically conveyed with dry air to separate extruder hoppers, which were also sealed to prevent moisture pickup. The polylactic acid polymer was fed into Extruder A, and the polybutylene succinate polymer was fed into Extruder B. The heating profile of Extruder A was set to achieve a final polylactic acid polymer melt at a temperature of 215° C. to 230° C. and throughput of 210 to 270 kilograms per hour. The heating profile of Extruder B was set to achieve a final polybutylene succinate polymer melt at a temperature of 200° C. to 215° C. and throughput of 30 to 90 kilograms per hour. Each extruder pumped their respective melt streams through a melt filter of standard mesh size and to a metering pump. Each of the positive displacement pumps controlled the throughput of the polymers at the aforementioned throughputs. The extruder rpm range was set to control to a constant pump inlet pressure. The molten polymers were then separately fed into a single heated spin pack assembly. The spin pack assembly arranged to two polymer streams in to an array of fibers exiting the spinneret in a sheath-core bicomponent configuration. The sheath was comprised of polybutylene succinate polymer and the core was comprised of polylactic acid polymer. The total pump rate was 300 kilograms per hour. Individual pump rates were adjusted at different moments to produce fibers in the range of 10% to 90% sheath and 30% to 70% core. The bicomponent fibers exiting the spinneret were quenched using a spunbond line available from Reifenhäuser GmbH & Co. KG Maschinenfabrik under the designation REICOFIL® 4.

The fibers were pneumatically drawn and then deposited directly onto a foraminous surface under vacuum to make a randomly formed nonwoven web. The foraminous surface rotated to form a nonwoven web at 300 kilograms per hour. Directly after the fibers formed a web, the web was annealed and stabilized under a rotating roll with a surface temperature 40° C. to 60° C. The stabilized web was then transferred through a calender roll nip and subjected to heat and pressure. The bond pattern was a diamond bond pattern of less than 30% bond area and greater than 100 pins per square inch. The web forming conditions for the samples are set forth below in Table 3 in more detail.

TABLE 3

Web Forming Conditions

| Sample | Sheath | Core | Chamber Draw Pressure (kPA) | Chamber Air Temps (° C.) | GHM | Bond Roll Temps (° C.) | Bond Roll Pressure (psi) | Line Speed (m/min) | Fiber Size (μm) | Basis Wt. (g/m²) |
|---|---|---|---|---|---|---|---|---|---|---|
| 1 | — | P11 | 10 | 51/70 | 0.83 | NA | 39 | 20 | 13 | 61 |
| 2 | — | P11 | 10 | 51/70 | 0.83 | NA | 39 | 101 | 13 | 62 |
| 3 | — | P11 | 10 | 50/70 | 0.83 | 160/155 | 80 | 170 | 13 | 38 |
| 4 | — | P11 | 10 | 50/70 | 0.83 | 155/150 | 80 | 170 | 13 | 39 |
| 5 | — | P11 | 9.5 | 50/70 | 0.67 | 147/137 | 68 | 165 | 11.9 | 27.4 |
| 6 | — | P11 | 9.5 | 51/70 | 0.67 | 147/137 | 68 | 173 | — | 26.8 |
| 7 | — | P12 (10%) P11 (90%) | 9.3 | 51/70 | 0.67 | 145/137 | 108 | 173 | — | 25.7 |
| 8 | — | P12 (20%) P11 (80%) | 9.21 | 51/70 | 0.67 | 145/137 | 108 | 173 | — | 27.4 |
| 9 | — | P12 (20%) P11 (80%) | 9.5 | 50/70 | 0.67 | 148/140 | 108 | 173 | — | 27.1 |
| 10 | — | P12 (20%) P11 (80%) | 9.5 | 50/70 | 0.67 | 151/143 | 108 | 173 | — | 27.1 |
| 11 | P4 (20%) | P11 (80%) | 3 | 30/30 | 0.67 | 110/105 | 58 | 180 | 17.4 | 25.4 |
| 12 | P4 (30%) | P11 (70%) | 3 | 30/30 | 0.67 | 110/105 | 58 | 180 | 17 | 25.4 |
| 13 | P4 (10%) | P11 (90%) | 3 | 30/30 | 0.67 | 110/105 | 58 | 180 | 16.2 | 26.4 |
| 14 | P4 (20%) | P11 (80%) | 5 | 40/40 | 0.67 | 110/105 | 58 | 180 | 16.2 | 18.9 |
| 15 | — | P4 | 3 | 15/15 | 0.67 | 100/95 | 20 | 180 | — | 21.1 |

Example 3

Polylactic acid and polypropylene spunbond webs were formed for use in a multi-layer nonwoven laminate. For each sample, the polymer was placed in separate desiccant driers and dried at temperature and time conditions within supplier recommendations. The polymer was then pneumatically conveyed with dry air to separate extruder hoppers, which were also sealed to prevent moisture pickup. The polymer was then fed into the extruder. For the polylactic acid samples, the heating profile of the extruder was set to achieve a final polylactic acid polymer melt at a temperature of 215° C. to 230° C. and throughput of 27 to 35 kilograms per hour. For the polypropylene samples, the heating profile of the extruder was set to achieve a final polylactic acid polymer melt at a temperature of 225° C. to 245° C. and throughput of 27 to 35 kilograms per hour. The extruder rpm range was set to control to a constant pump inlet pressure. The spin pack assembly arranged the polymer into an array of fibers having a monocomponent configuration. The fibers exiting the spinneret were quenched to cool the fibers. The fibers were pneumatically drawn down to a final diameter of between 12 to 20 micrometers by altering the pneumatic pressure of air entering the draw unit.

The fibers were then deposited directly onto a foraminous surface under vacuum to make a randomly formed nonwoven web. Directly after the fibers formed a web, the web was annealed and stabilized under a hot air supply at about 120° C. The stabilized web was then transferred through a calender roll nip and subjected to heat and pressure. The bond pattern was a wire weave pattern of about 15% bond area and about 300 pins per square inch with pin depth of 0.038 inches. The web forming conditions for the samples are set forth below in Table 4 in more detail.

TABLE 4

Web Forming Conditions

| Sample | Polymer | Chamber Draw Pressure (kPA) | Quench Air Temps (° C.) | GHM | Bond Roll Temps (° C.) | Bond Roll Pressure (psi) | Line Speed (m/min) | Basis Wt. (g/m²) |
|---|---|---|---|---|---|---|---|---|
| 16 | P13 | 62 | 100/100 | 0.5 | 153/152 | 20 | 100 | 16 |
| 17 | P14 | 28 | 20/20 | 0.5 | 154/154 | 20 | 100 | 20 |
| 18 | P14 | 28 | 20/20 | 0.5 | 154/154 | 20 | 75 | 27 |

Example 4

Three meltblown web samples (Samples 19-21) were formed for use in a multi-layer nonwoven laminate of the present invention. As indicated in Table 5 below, various polymers were tested. The polymers were placed in a desiccant drier and dried at temperature and time conditions within supplier recommendations. The polymer was then pneumatically conveyed with dry air to an extruder hopper, which was also sealed to prevent moisture pickup. The heating profile of the extruder was set to achieve a polymer melt at a temperature of 290° C. to 325° C. (Sample 1), 300° C. to 400° C. (Sample 2), 310° C. to 415° C. (Sample 3). The extruder pumped the melt stream through a melt filter of standard mesh size and to a metering pump. A positive displacement pump controlled the throughput of the polymer at the aforementioned throughput. The extruder was set to 2 revolutions per minute and the total pump rate was 3.9 grams per minute. The meltblown die tip had 20 holes per inch, each having a size of 1/15,000 inches.

After formation, the fibers were deposited directly onto a foraminous surface under vacuum to make a randomly formed nonwoven web. The foraminous surface rotated to form a nonwoven web at 3.9 grams per minute. Directly after the fibers formed a web, the web was annealed and stabilized under a rotating roll with a surface temperature 40° C. to 60° C. and a standard nip pressure in a manner familiar to persons skilled in the art. The stabilized web was then transferred through a calender roll nip and subjected to heat and pressure. The bond pattern was a diamond bond pattern of less than 30% bond area and greater than 100 pins per square inch. The bonded web was then wound on a surface driven winder of standard design to persons skilled in the art. The web forming conditions for the samples are set forth below in Table 5 in more detail.

TABLE 5

Web Forming Conditions

| Meltblown Sample | Polymer | Air Temp. 1 (° F.) | Air Press. 1 (psi) | Air Temp. 2 (° F.) | Air Press. 2 (psi) | Die Tip Temp. (° F.) | Basis Wt. (g/m²) |
|---|---|---|---|---|---|---|---|
| 19 | P2 | 350 | 55 | 350 | 54 | 325 | 25.2 |
| 20 | P2 | 500 | 58 | 500 | 58 | 425 | 21.7 |
| 21 | Polypropylene* | 440 | 58 | 480 | 58 | 425 | 22.1 |

*The polypropylene polymer was obtained from Basell Polyolefins under the designation "PP PF015."

Various properties of the resulting nonwoven webs were also tested, the results of which are set forth below in Table 6.

TABLE 6

Mechanical Properties

| Meltblown Sample | Peak MD Load (g_f/2 in.) | Peak CD Load (g_f/2 in.) | % Elongation at MD Peak Load | % Elongation at CD Peak Load | Comment |
|---|---|---|---|---|---|
| 19 | 1132 | 634 | 35 | 34 | Rough |
| 20 | 1091 | 592 | 14 | 16 | Soft |
| 21 | 1147 | 874 | 19 | 56 | Soft |

Example 5

Various SMS laminates (Samples 22-25) were formed from one of the spunbond webs of Example 2 (Sample 12) and the meltblown webs of Example 4 (Samples 19-21), as set forth below in Table 7. The webs were sequentially deposited onto a foraminous surface and passed through two 24-inch wide calender rolls, both of which were heated to a temperature of 260° F. (127° C.). The laminate was bonded at a pressure of 40 pounds per square inch and a rate of 30 feet per minute. The top roll contained a Y-dot pattern (each "Y" consisted of 6 pins of 0.33 mm radius and 1.6 mm depth) so that the resulting bond pattern was a Y-dot pattern of about 18% bond area and 17 "Y" dots (or 102 pins per square inch). The forming conditions for the samples are set forth below in Table 7 in more detail.

TABLE 7

SMS Laminate Forming Conditions

| SMS Sample | Top Spunbond Layer | Meltblown Layer | Bottom Spunbond Layer | Basis Wt. (g/m²) |
|---|---|---|---|---|
| 22 | Sample 12 (Ex. 2) | Sample 19 (Ex. 4) | Sample 12 (Ex. 2) | 76.0 |
| 23 | Sample 12 (Ex. 2) | Sample 20 (Ex. 4) | Sample 12 (Ex. 2) | 76.0 |
| 24 | Sample 16 (Ex. 3) | Sample 20 (Ex. 4) | Sample 16 (Ex. 3) | 53.0 |
| 25 | Sample 17 (Ex. 3) | Sample 21 (Ex. 4) | Sample 18 (Ex. 3) | 69.8 |

Various properties of the resulting SMS laminates were also tested, the results of which are set forth below in Table 8.

TABLE 8

Mechanical Properties

| SMS Sample | Peak MD Load (g_f) | Peak CD Load (g_f) | % Elongation at MD Peak Load | % Elongation at CD Peak Load | Average Peel Strength (g_f) | | | Comment |
|---|---|---|---|---|---|---|---|---|
| | | | | | 2" | 4" | 6" | |
| 22 | 12,586 | 8,119 | 46 | 58 | 597 ± 72 | 538 ± 21 | 484 | Soft, strong |
| 23 | 12,043 | 7,461 | 44 | 50 | 447 ± 129 | 469 ± 90 | 465 ± 78 | Soft, strong |

TABLE 8-continued

Mechanical Properties

| SMS Sample | Peak MD Load (g_f) | Peak CD Load (g_f) | % Elongation at MD Peak Load | % Elongation at CD Peak Load | Average Peel Strength (g_f) | | | Comment |
|---|---|---|---|---|---|---|---|---|
| | | | | | 2" | 4" | 6" | |
| 24 | 6,024 | 3,006 | 33.8 | 17 | 166 ± 60 | 139 ± 45 | 103 | Soft, relatively weak |
| 25 | 8,765 | 4,817 | 49 | 54 | — | — | 6.2 ± 1.4 | Son, no bonding |

As indicated above, Samples 22-23 exhibited superior mechanical properties to Samples 24-25, One of the reasons for the difference in mechanical properties was that a bonding temperature of 260° F. (~127° C.) was apparently too low to sufficiently bond the laminates of Samples 24-25. However, at much higher temperatures, the polymers of the meltblown would completely melt, thereby adversely affecting the performance and aesthetics of the laminates.

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A biodegradable nonwoven laminate comprising:
a first spunbond layer formed from substantially continuous filaments that contain a first aliphatic polyester having a melting point of from about 50° C. to about 160° C., wherein the first aliphatic polyester is polybutylene succinate; and
a meltblown layer formed from microfibers that contain a second aliphatic polyester having a melting point of from about 50° C. to about 160° C., wherein the second aliphatic polyester is polybutylene succinate;
wherein the first aliphatic polyester and the second aliphatic polyester have an apparent viscosity of from about 30 to about 200 Pascal-seconds, as determined at a temperature of 160° C. and a shear rate of 1000 sec$^{-1}$, and wherein the melt flow index of the first aliphatic polyester is from about 20 to about 120 grams per 10 minutes and the melt flow index of the second aliphatic polyester is from about 125 to about 1500 grams per 10 minutes, measured at a force of 2160 grams and temperature of 190° C. in accordance with ASTM Test Method D1238-E37, and wherein the filaments of the first spunbond layer and the microfibers of the meltblown layer are free of a multi-carboxylic acid nucleating agent.

2. The biodegradable nonwoven laminate of claim 1, wherein the first aliphatic polyester, the second aliphatic polyester, or both, have a melting point of from about 100° C. to about 140° C.

3. The biodegradable nonwoven laminate of claim 1, wherein the apparent viscosity of the first aliphatic polyester is from about 80 to about 150 Pascal-seconds.

4. The biodegradable nonwoven laminate of claim 1, wherein the apparent viscosity of the second aliphatic polyester is from about 40 to about 100 Pascal-seconds.

5. The biodegradable nonwoven laminate of claim 1, wherein the first aliphatic polyester, the second aliphatic polyester, or both have a number average molecular weight of from about 40,000 to about 100,000 Daltons.

6. The biodegradable nonwoven laminate of claim 1, wherein the first aliphatic polyester, the second aliphatic polyester, or both have a polydispersity index of from about 1.0 to about 3.0.

7. The biodegradable nonwoven laminate of claim 1, wherein the first aliphatic polyester, the second aliphatic polyester, or both have a glass transition temperature of about 0° C. or less.

8. The biodegradable nonwoven laminate of claim 1, wherein the first aliphatic polyester, the second aliphatic polyester, or both have a glass transition temperature of about −10° C. or less.

9. The biodegradable nonwoven laminate of claim 1, wherein the filaments also contain an additional polymer.

10. The biodegradable nonwoven laminate of claim 9, wherein the additional polymer is a polyolefin.

11. The biodegradable nonwoven laminate of claim 9, wherein the additional polymer is a third aliphatic polyester having a melting point of from about 160° C. to about 250° C.

12. The biodegradable nonwoven laminate of claim 11, wherein the third aliphatic polyester is polylactic acid.

13. The biodegradable nonwoven laminate of claim 9, wherein the filaments are multicomponent filaments containing a first component and a second component, the first component containing the first aliphatic polyester and the second component containing the additional polymer.

14. The biodegradable nonwoven laminate of claim 9, wherein the filaments are multiconstituent filaments.

15. The biodegradable nonwoven laminate of claim 1, wherein the microfibers are monocomponent fibers.

16. The biodegradable nonwoven laminate of claim 1, further comprising a second spunbond layer, wherein the meltblown layer is positioned between the first and second spunbond layers.

17. A biodegradable nonwoven laminate comprising:
a first spunbond layer formed from substantially continuous filaments;
a second spunbond layer formed from substantially continuous filaments, wherein the filaments of the first and second spunbond layers each contain a first component and a second component, the first component containing a first low melting point aliphatic polyester having a melting point of from about 50° C. to about 160° C. and an apparent viscosity of from about 30 to about 200 Pascal-seconds, as determined at a temperature of 160° C. and a shear rate of 1000 sec$^{-1}$, and wherein the melt flow index of the first aliphatic polyester is from about 20 to about 120 grams per 10 minutes, measured at a force of 2160 grams and temperature of 190° C. in accordance with ASTM Test Method D1238-E, wherein the first aliphatic polyester is polybutylene succinate, wherein the second component contains a high melting point aliphatic polyester having a melting point of from about 160° C. to about 250° C.; and a meltblown layer positioned between the first spunbond layer and the second spunbond layer, the meltblown layer being formed from microfibers that contain a second low melting point aliphatic polyester having a melting point of from about 50° C. to about 160° C. and an apparent viscosity of from about 30 to about 200 Pascal-seconds, as determined at a temperature of 160° C. and a shear rate of 1000 sec$^{-1}$, and wherein the melt flow index of the second aliphatic polyester is from about 125 to about 1500 grams per 10 minutes, measured at a force of 2160 grams and temperature of 190° C. in accordance with ASTM Test Method D1238-E, wherein the second aliphatic polyester is polybutylene succinate, and wherein the filaments of the first spunbond layer, the filaments of the second spunbond layer, and the microfibers of the meltblown layer are free of a multi-carboxylic acid nucleating agent.

18. The biodegradable nonwoven laminate of claim 17, wherein the first low melting point aliphatic polyester, the second low melting point aliphatic polyester, or both, have a melting point of from about 100° C. to about 140° C.

19. The biodegradable nonwoven laminate of claim 17, wherein the high melting point aliphatic polyester is polylactic acid.

20. The biodegradable nonwoven laminate of claim 17, wherein the spunbond layers and the meltblown layer are autogeneously bonded.

* * * * *